UNITED STATES PATENT OFFICE.

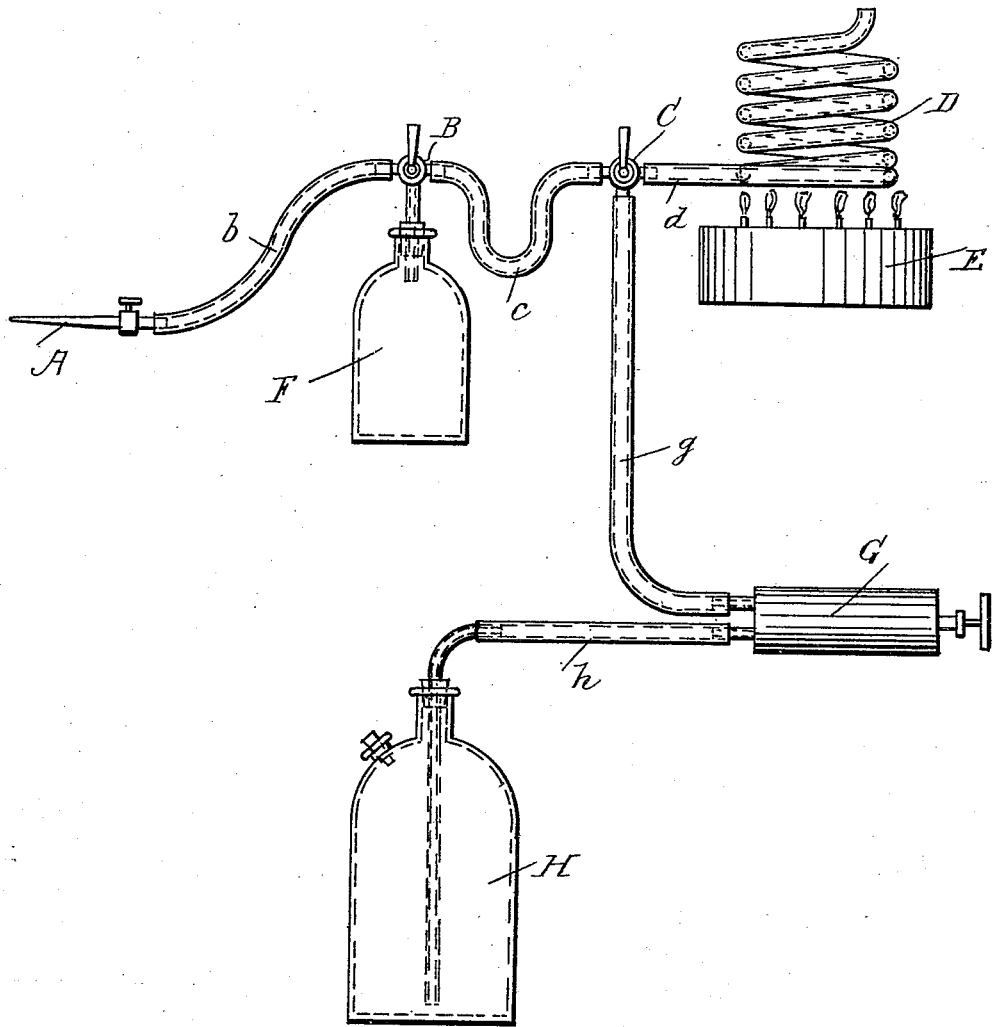

OLE SKOW, OF SOLDIER, IOWA.

EMBALMING APPARATUS.

No. 908,160.  Specification of Letters Patent.  Patented Dec. 29, 1908.

Application filed April 1, 1908. Serial No. 424,607.

*To all whom it may concern:*

Be it known that I, OLE SKOW, a citizen of the United States, residing at Soldier, in the county of Monona and State of Iowa, have invented certain new and useful Improvements in Embalming Apparatus; and I do hereby declare the following to be a full, clear, and exact description of the invention, such as will enable others skilled in the art to which it appertains to make and use the same.

This invention relates to apparatus used in embalming the bodies of the dead; and it consists in the novel construction and combination of the parts hereinafter fully described and claimed whereby all gas and liquid escaping from the body are sterilized.

The drawing shows a side view of the apparatus in the form of a diagram.

A is a trocar which is inserted into the colon or other approved part of the body.

B is a three-way valve which is connected to the trocar by a flexible pipe or tube $b$.

C is a second three-way valve which is connected to the three-way valve B by a pipe or tube $c$.

D is a sterilizing worm formed of metallic pipe and connected to the three-way valve C by a pipe $d$.

E is a source of heat, such as a spirit-lamp or a gas-stove or gas-burner of any approved construction, by means of which the worm D is heated to a temperature sufficient to destroy all bacteria and their germs.

F is a receiving vessel or bottle for liquid connected to the three-way valve B.

G is a pump or injector such as used by embalmers, which is connected to the three-way valve C by a flexible tube or pipe $g$, and H is a bottle or other receptacle for holding the embalming liquid, connected to the pump G by a flexible tube $h$.

The trocar is inserted into the body, and all gas which passes out through the pipe or pipes $b$, $c$ and $d$, is sterilized in its passage through the sterilizing vessel or worm D before being permitted to escape into the atmosphere. The mucous and liquid matter passing out of the body through the pipe $b$ is caught in the receiving vessel or bottle F which contains some suitable germicide, such as any approved embalming liquid. When the body does not emit liquid matter, the valve B and vessel F are not required. The valve B can be turned to close the inlet to the vessel F, and the vessel F can be removed whenever desired. When the gas and liquid matter has escaped from the body, the two three-way valves are turned so as to cut off the communication between the pipe $d$ and the vessel F and worm D, and the pump or injector G is placed in communication with the pipe $b$, and a suitable quantity of embalming liquid is injected into the body.

What I claim is:

1. In embalming apparatus, the combination, with a trocar, and a pipe connected thereto and normally communicating with the atmosphere; of means for sterilizing gas in its passage through the said pipe, an injector for embalming liquid also connected to the said pipe, and valve mechanism for controlling the connection of the said pipe with the said injector and with the atmosphere.

2. In embalming apparatus, the combination, with a trocar, and a pipe connected thereto at one end and provided with a sterilizing vessel at its other end; of means for heating the said vessel to sterilize the gas which passes through it, a closed receptacle for receiving liquid matter from the said pipe connected to it adjacent to the said trocar, an injector for embalming liquid operatively connected with the said pipe, and valve mechanism for controlling the connection of the said sterilizing vessel, receptacle and injector with the said pipe.

3. In embalming apparatus, the combination, with a trocar, and a pipe connected to it at one end and provided with a sterilizing vessel at its other end which communicates with the atmosphere; of a three-way valve connected to the said pipe near the said trocar, a closed receptacle for liquid connected to the said valve, a second three-way valve connected to the said pipe near the said sterilizing vessel, means for heating the said vessel, and an injector for embalming liquid connected to the last said three-way valve.

In testimony whereof I have affixed my signature in the presence of two witnesses.

OLE SKOW.

Witnesses:
 GEO. N. KIEFFER,
 W. E. LOYD.